INVENTORS
GEORGE W. SHEARY, III
JAMES E. STEELE

Nov. 25, 1969  G. W. SHEARY III, ETAL  3,480,326
MECHANICAL DEEP SEA NODULE HARVESTER
Filed Dec. 18, 1968  4 Sheets-Sheet 3

INVENTORS
GEORGE W. SHEARY, III
JAMES E. STEELE

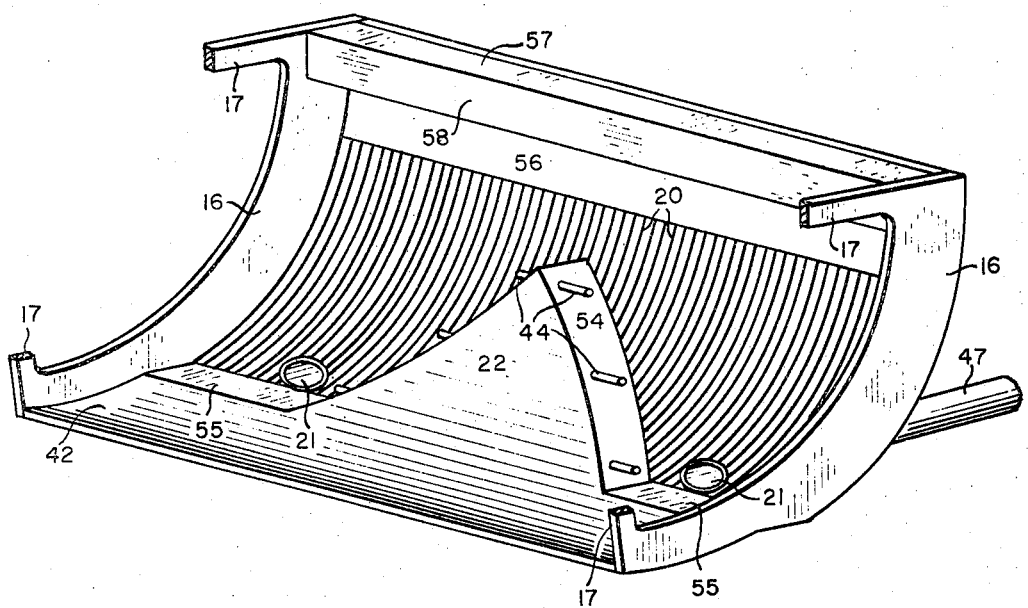

United States Patent Office 3,480,326
Patented Nov. 25, 1969

3,480,326
MECHANICAL DEEP SEA NODULE HARVESTER
George W. Sheary III, Bethlehem, and James E. Steele, Quakertown, Pa., assignors to Bethlehem Steel Corporation, a corporation of Delaware
Filed Dec. 18, 1968, Ser. No. 784,718
Int. Cl. E02f 7/00
U.S. Cl. 299—8          4 Claims

ABSTRACT OF THE DISCLOSURE

Bottom crawler traverses marine floor under control of floating vessel. Crawler is provided with wheels having radially extending treads which penetrate the ocean floor and collect solid material therebetween. The solid material is jetted out of the treads by high pressure water, passed over a grizzly, and delivered to a separator for further classification. Large solids fall to the bottom of the separator, while smaller solids and water are pumped out of the top of the separator. Another pump in riser pipe communicating between crawler and floating vessel creates fast upwardly moving stream of water entraining large solids from bottom of separator and transporting said solids to floating vessel.

BACKGROUND OF THE INVENTION

This invention relates generally to apparatus for mining solid material, either organic or inorganic, of a predetermined size, from the floor of a body of water. More particularly, this invention relates to apparatus for collecting solid material from the surface of, or immediately below, the ocean floor, for separating nodules, e.g. manganese nodules, of a predetermined minimum size from smaller nodules, sand, mud, and water, and means for transporting substantially only the nodules of said predetermined minimum size to the ocean surface in an entraining stream of water.

One of the objects of this invention is to provide an improved mechanical pickup apparatus for mining nodules from the surface of the ocean floor.

SUMMARY OF THE INVENTION

Briefly, we have discovered that the foregoing objects can be attained by providing a vehicle adapted to traverse the ocean floor, a wheel rotatably connected to and supporting said vehicle, said wheel being adapted to rotate along said floor during travel of said vehicle, a plurality of radially extending treads disposed about the periphery of said wheel, said treads being adapted to penetrate said floor and collect solid material therebetween, a housing, disposed about a lower segment of said wheel rearwardly of its direction of travel, said housing comprising: (1) an apron adapted to receive the material from said floor collected between said treads during travel of said vehicle; and (2) sieve means adapted to permit solids smaller than a predetermined minimum size to pass through said housing, means for directing jets of water toward said treads to eject solid material therefrom, suction means for removing solid material from said housing, and means for transporting said solid material to a floating vessel.

BRIEF DESCRIPTION OF THE DRAWINGS

FIGURE 7 is an isometric view showing details of the mechanical pick-up means.

DESCRIPTION OF THE PREFERRED EMBODIMENT

Figure 1:
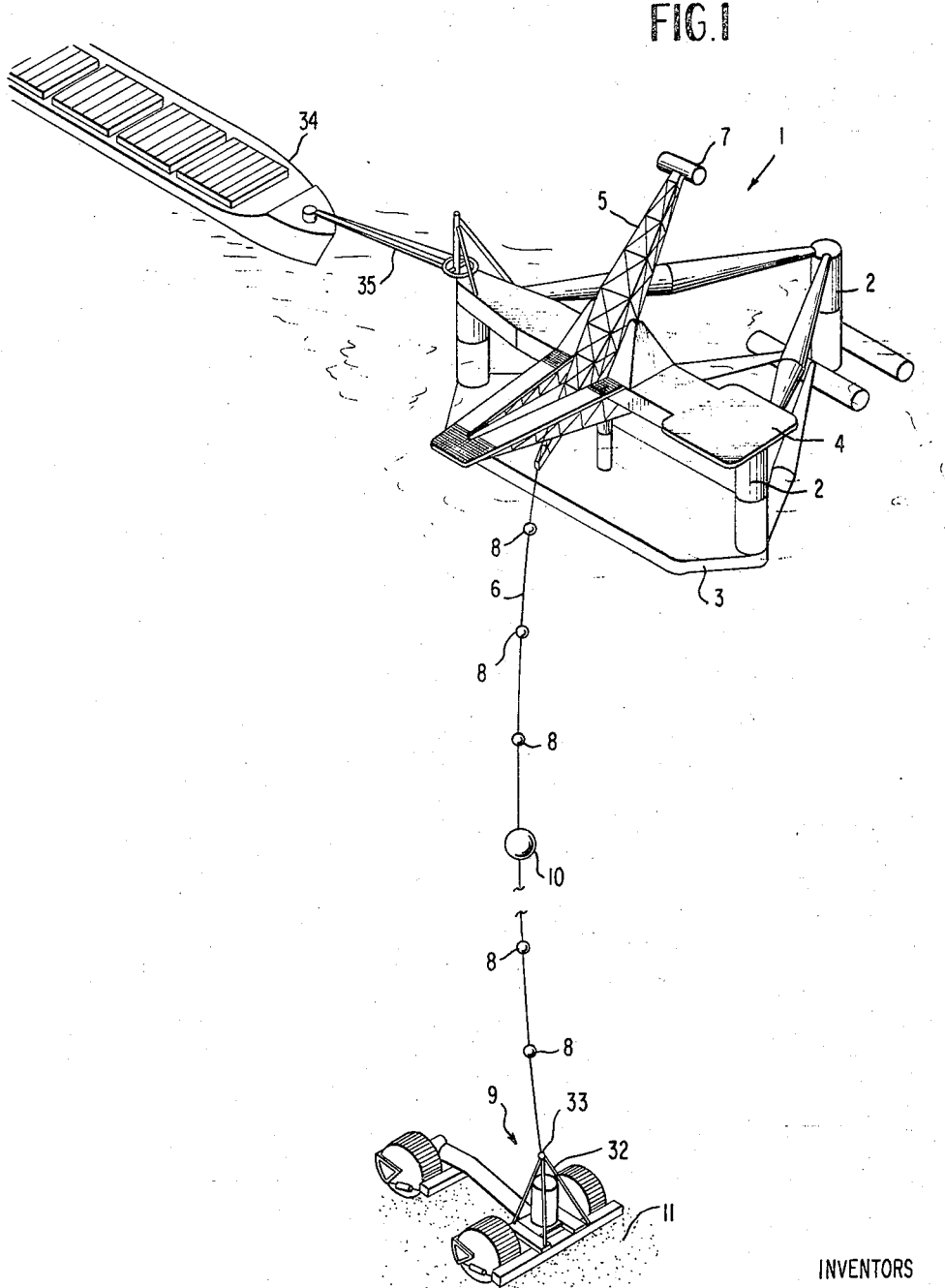
FIGURE 1 is an isometric view showing the floating vessel, having an ore ship moored thereto, and the bottom crawler in operative position on the marine floor.

As shown in FIGURE 1, floating vessel 1, the center of operations, is of the well-known "column-stabilized" type, comprising stabilizing columns 2 mounted on a base 3 and supporting an operating platform 4. Propulsion means (not shown) is provided on surface vessel 1 to move the same in a desired direction at a desired velocity.

Boom 5, pivotally mounted on operating platform 4, supports riser pipe 6 and is provided with counterweight 7, thereby preventing sudden stresses from being imposed on riser pipe 6 due to changes in bottom topography and/or wave motion.

Riser pipe 6 is provided with buoyancy means, e.g., spheres 8, at spaced intervals to buoyantly support the pipe 6, thereby preventing the entire weight thereof from being imposed on itself or on boom 5. When it is considered that mining operations may conceivably be conducted in 18,000 feet of water, it will be appreciated that the dead weight of pipe 6 can be considerable. The bottom end of riser pipe 6 extends down to bottom crawler 9 in a manner to be described. At a point intermediate the ends of riser pipe 6, a combination buoyancy sphere and pump chamber 10 is provided, housing a multistage centrifugal pump (not shown), the intake of the pump communicating with that portion of pipe 6 lying below sphere 10 and the discharge of the pump communicating with that portion of pipe 6 lying above sphere 10.

Figure 2:
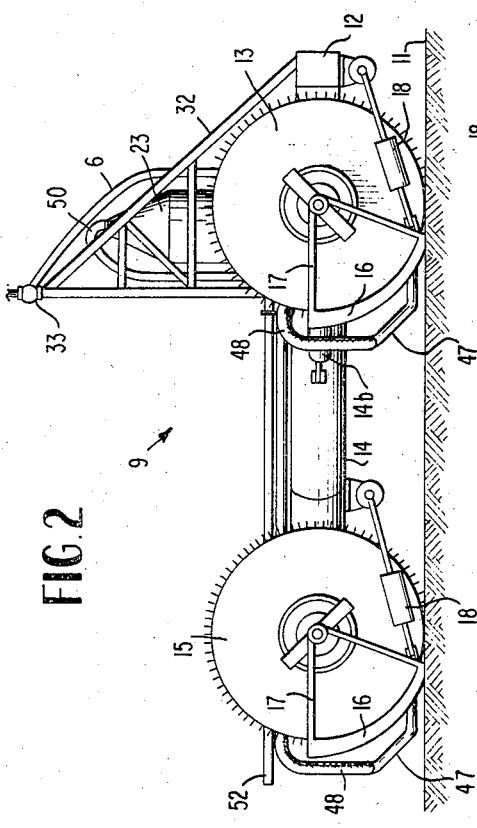
FIGURE 2 is a side elevation of the bottom crawler.
Figure 3:
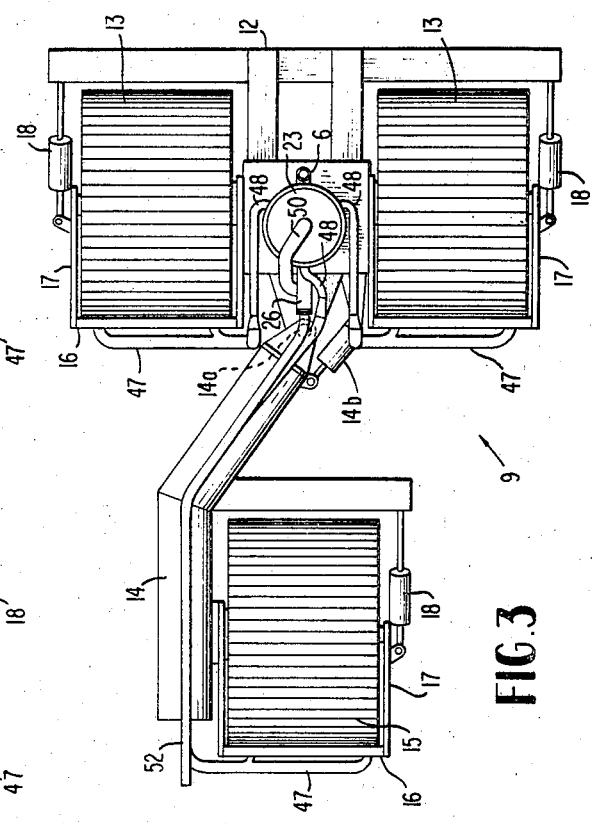
FIGURE 3 is a plan view of the bottom crawler.

As shown in detail in FIGURES 2 and 3, bottom crawler 9 is a self-propelled vehicle adapted to traverse the marine floor 11 in a desired direction at a desired velocity, and comprises frame 12 on which tractor wheels 13, each with treads, are rotatably mounted, subframe 14 on which tractor wheel 15, also with treads, is rotatably mounted and pivotally connected to frame 12 at joint 14a for movement in a horizontal plane. Hydraulically operated cylinder 14b is interposed between frame 12 and subframe 14 and can be extended or retracted to change the angular relation between frame 12 and subframe 14 thereby to steer the bottom crawler 9.

Enclosed within frame 12 and tractor wheels 13 are various components (not shown) constituting a drive for said tractor wheels 13. Enclosed within subframe 14 and tractor wheel 15 may be similar various components (not shown) constituting a drive for tractor wheel 15.

The dead weight of bottom crawler 9 on marine floor 11 is reduced by suitable means such as foam or gasoline provided within frame 12 and subframe 14.

Figure 5:
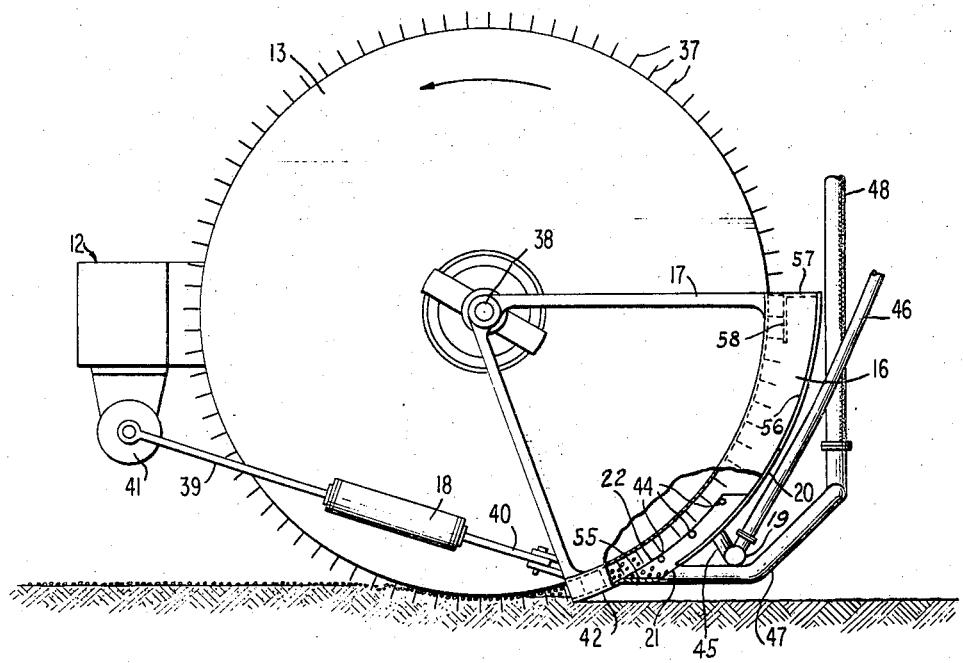
FIGURE 5 is a side elevation of the mechanical pickup means.
Figure 6:
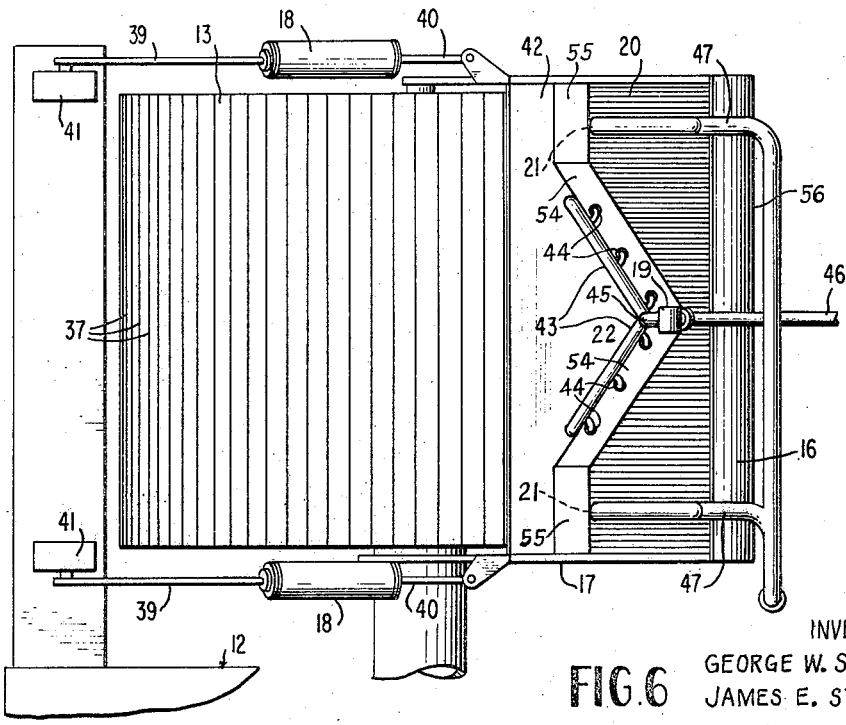
FIGURE 6 is a bottom plan view of the means shown in FIGURE 5.

As is shown in detail in FIGURES 5 and 6, the wheels 13 (as well as wheel 15) are provided with radially extending treads 37 which penetrate the ocean floor and collect solid material therebetween. If desired, the maximum size of the material so collected may be limited by encircling the treads 37 with rods (not shown) spaced apart. In this manner, damage to or clogging of the apparatus by oversize material can be prevented.

Disposed about a lower segment of each wheel, rearwardly of its direction of travel, is a housing 16 connected to the axle 38 of the wheel by radial members 17. Circumferential adjustment of the housing 16 may be accomplished by means of hydraulic restrainers 18 disposed on each side of the wheel. This adjustment places the cutting edge of the apron in a position to obtain the proper depth of cut thru the sediment and under the solid material in order to collect the minimum amount of sediment. Each restrainer 18 is connected to rods 39 and 40 which extend between the bottom of the housing 16 and suitable supports 41 affixed to the frame 12.

Each housing 16 comprises an apron 42, adapted to receive the material from said floor collected between the treads 37 during travel of the bottom crawler 9, and sieve means, e.g. grizzly 20, to permit solids smaller than a predetermined minimum size to pass through said housing. The upper end of the grizzly 20 is connected to a structural plate 56. The plate 56 in turn is connected to a top plate 57 having one edge contiguous to the path of the outermost points of the treads and a seal plate 58 extending downwardly close to said path. The seal plate 58 should be sufficiently wide to cover the space between three treads.

As is shown in FIGURE 7, the rear of the apron 42 is provided with a triangular section 22 which extends upwardly whereby one face thereof is substantially contiguous to the path of the outermost points of said treads. The triangular section 22 is provided with rearwardly extending side plates 54 which are connected, e.g. welded, to the grizzly 20. The plates 54 are connected at their lower ends to shelf-like members 55.

To the rear of the triangular section 22, nested between the side plates 54, are conduits 43 provided with a plurality of exit ports 44 which extend through said side plates 54 and are adapted to direct jets of water toward the periphery of the wheel passing through the housing 16 whereby solid material entrapped between the treads 37 is ejected therefrom by said jets. The conduits 43 are connected to a supply conduit 45 which is connected to the discharge side of a pump 19 which provides high pressure water for the exit ports. The pump suction is connected to a long conduit 46 to place the intake therefor above the grizzly 20 through which sediment is being discharged.

Disposed at each side of the housing 16, directly at the top of the apron 42 and to the rear of each shelf-like member 55, is a suction port 21. Solids which are ejected from the treads 37 slide down the side plates 54 toward the shelf-like members 55 from which they are sucked out of the housing 16 through said ports 21.

Each of the suction ports 21 is connected to a conduit 47. The conduits 47 are connected to a flexible hose 48 which leads to the intake side of a separator 23 mounted on the frame 12. The function of the separator 23, is to separate solids of a predetermined minimum size from smaller solids and substantially all of the collected water. The separator 23 broadly comprises a vessel having an upper end out of which said smaller solids and substantially all of said collected water flow, a lower end having a discharge opening toward which solids of a predetermined minimum size fall, and inlet means disposed between said upper end and said lower end.

Figure 4:
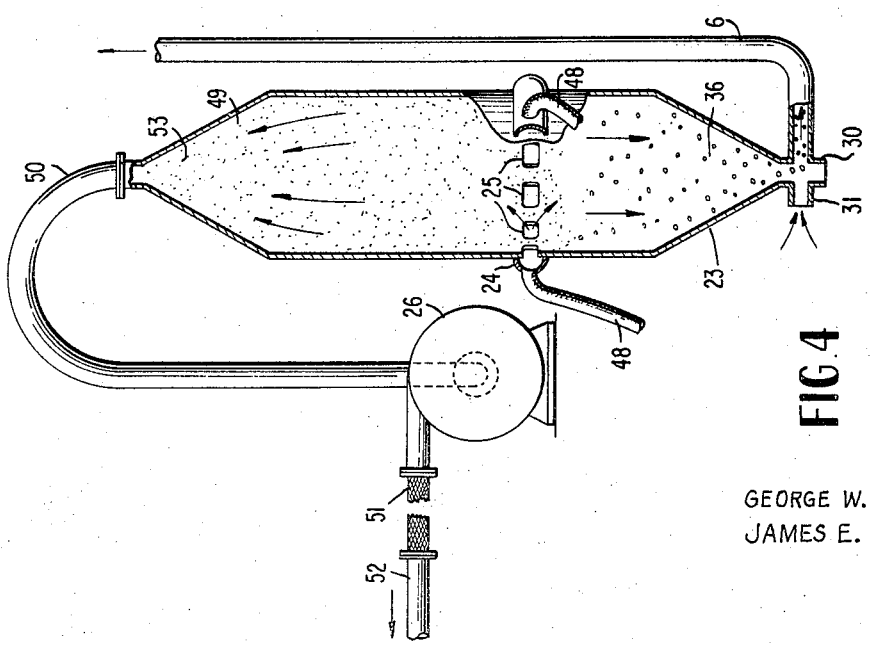
FIGURE 4 is an enlarged side elevation view, partially in media section, of the separator and pump.

As is shown in detail in FIGURE 4, the separator 23 comprises a cylindrical middle section provided with inlet means comprising spaced apertures 25, said apertures being enclosed with a conduit 24 communicating with each hose 48 leading from the wheels 13 and 15. The upper and lower sections of the separator are conical, the apex 49 of the upper section communicating via a conduit 50 with a suction pump 26 mounted on frame 12. The discharge side of the pump 26 is connected to a flexible hose 51 and an exhaust pipe 52, the pipe 52 extending beyond the rear of the crawler 9 whereby smaller solids are discharged to the rear of wheel 15. The bottom of the separator 23 is provided with an apertured neck 30 to which riser pipe 6 is connected. Additionally, another apertured tube 31 may be mounted on the bottom of separator 23 in registry with riser pipe 6.

Bottom crawler 9 is provided with a pickup frame 32 mounted on frame 12, and a swivel pipe joint 33 in the line constituting riser pipe 6 is supported at the upper end of pickup frame 32, whereby to permit some freedom of angular movement of riser pipe 6 adjacent the bottom crawler 9.

As shown in FIGURE 1, an ore vessel 34 is moored to floating vessel 1, through mooring boom 35, and a loading pipe (not shown) extending through mooring boom 35 from floating vessel 1 to ore vessel 34 permits the nodules to be transferred from the floating vessel 1 to the ore vessel 34.

The operation of the preferred embodiment will now be described.

The bottom crawler 9 is lowered from the surface of the body of water to the marine floor 11 by adding extensions to the riser pipe 6 after gasoline, for example, has been added to frame 12 and subframe 14 to reduce the dead weight of the bottom crawler 9.

Floating vessel 1 is propelled in the desired direction, carrying with it ore vessel 34 moored thereto, and bottom crawler 9 is propelled in the same direction and at the same velocity, being controlled remotely by suitable means, not shown, but understood by those familiar with this art.

The pump (not shown) in sphere 10 is operated to create a fast upwardly moving stream of water in riser pipe 6. For example, said pump may operate at a pressure of 2,400 p.s.i. to raise 3,700 g.p.m. of water at a velocity of about 15 feet per second.

Pump 19 is then energized whereby jets of water are directed toward the solid material collected between the treads of the wheels 13 and 15. Concomitantly, pump 26 is energized whereby water and solid material are sucked into the apertures 25 of the separator 23. Pump 26 may operate at a pressure of 10 p.s.i. and suck 75,000 g.p.m. of water into said separator.

The rough presized solid material entering the separator through apertures 25 is characterized by a certain fall velocity, said velocity being dependent primarily on the density, size and shape of the material. If this wall velocity is greater than the velocity of the rising water in the separator, the material will fall to the bottom of the separator and be entrained in the stream of water flowing through the riser pipe 6. By controlling the velocity of the water flowing upwardly in the separator, the degree of separation can be controlled. For example, an upward flow of about one foot per second will result in nodules having a cross-section of ⅜ inch and larger falling to the bottom of the separator, while remaining smaller nodules and non-nodular material, e.g. sand and mud 53, will be carried out the top of the separator. The upward velocity in the separator is a function of the separator shape and size, and also the volume of discharge of the pump 26.

The amount of water utilized in transporting the desired nodules to the ocean surface is about one-twentieth of the amount delivered to the separator 23.

Apertured tube 31 permits the nodule-entraining stream of water to pass across the open bottom of separator 23 without making a change in direction.

Apertured neck 30 permits nodules 36 to drop out of separator 23 in the event there is a malfunction of the pump in sphere 10 while pump 26 is operating. In this manner choking up of separator 23 is avoided. If desired, a spring-loaded closure may be disposed across the bottom of neck 30.

As the nodules reach the floating vessel 1, they are transferred to ore vessel 34 where they are separated from the entraining water.

Upon completion of operations, the bottom crawler 9 may be raised from marine floor 11 by removing the extensions from the riser pipe 6.

While the invention has been described in connection with the mining of nodules from the ocean floor, the subject apparatus may also be utilized for mining living organisms, e.g. clams, oysters and the like.

We claim:

1. In apparatus for mining solid material of a predetermined minimum size from the floor of a body of water, said apparatus comprising a vehicle adapted to travel along said floor and means for transporting solids between said vehicle and a vessel disposed at the surface of said body of water, the improvement comprising:
   (a) a wheel rotatably connected to and supporting said vehicle, said wheel being adapted to rotate along said floor during travel of said vehicle,
   (b) a plurality of radially extending treads disposed about the periphery of said wheel, said treads being adapted to penetrate said floor and collect solid material therebetween,
   (c) a housing, disposed about a lower segment of said wheel rearwardly of its direction of travel, comprising:
      (1) an apron adapted to receive the material from said floor collected between said treads during travel of said vehicle; and
      (2) sieve means adapted to permit solids smaller than said predetermined minimum size to pass through said housing,
   (d) means, disposed in said housing, for directing jets of water toward the portion of the periphery of said wheel passing through said housing whereby solid material collected between said treads is ejected therefrom,
   (e) suction means connected to said housing for removing solid material therefrom, and
   (f) means connecting said suction means to said means for transporting solids between said vehicle and said vessel.

2. The improvement as recited in claim 1, further comprising:
   (g) means disposed in said housing for directing solid material of a predetermined minimum size, which is ejected from said treads, toward said suction means.

3. The improvement as recited in claim 2, in which:
   (i) means (e) comprises first and second suction tubes, each of said tubes being disposed at opposite sides of said housing, and
   (ii) means (g) comprises first and second plates inclining downwardly toward said suction tubes.

4. The improvement as recited in claim 3, in which rotation of said wheel propels said vehicle along said floor.

References Cited

UNITED STATES PATENTS

| | | | |
|---|---|---|---|
| 532,183 | 1/1895 | Pike | 299—8 |
| 1,220,197 | 3/1917 | Cowles | 299—8 |
| 2,482,355 | 9/1949 | McBride. | |
| 3,314,174 | 4/1967 | Haggard | 37—54 |

ERNEST R. PURSER, Primary Examiner

U.S. Cl. X.R.

37—55, 59, 63